United States Patent [19]

Glassey

[11] Patent Number: 5,105,897
[45] Date of Patent: Apr. 21, 1992

[54] REINFORCED BASE ASSEMBLY FOR BEAM BALANCE INSTRUMENT

[75] Inventor: Eugene A. Glassey, San Diego, Calif.

[73] Assignee: Fluid Data Systems, San Diego, Calif.

[21] Appl. No.: 669,997

[22] Filed: Mar. 15, 1991

[51] Int. Cl.$^5$ .......................................... G01G 21/28
[52] U.S. Cl. .................................................. 177/244
[58] Field of Search ............................ 177/244–246

[56] References Cited

U.S. PATENT DOCUMENTS

| 3,121,466 | 2/1964 | Mittelsteadt | 177/246 |
| 4,266,430 | 5/1981 | Glassey | 73/701 |
| 4,277,981 | 7/1981 | Glassey | 73/701 |
| 4,971,177 | 11/1990 | Nojiri et al. | 177/245 X |

OTHER PUBLICATIONS

Fluidage Bulletin 1000, Fluid Data Systems, 1985.
Water Gage II Brochure, Fluid Data Systems.

*Primary Examiner*—George H. Miller, Jr.
*Attorney, Agent, or Firm*—Brown, Martin, Haller & McClain

[57] ABSTRACT

A base assembly for a beam balance instrument includes a box-like, open bottom base of lightweight sheet metal having an elongated slot in its upper wall, and a reinforcing strip or bar inlaid into the slot for rigidly supporting parts of the balance. The reinforcing strip is thicker and bulkier than the remainder of the base, and the fulcrum which pivotally supports the beam above the base is rigidly fastened on the strip, as is the sensor for detecting tilting of the beam in response to an applied force, and the bellows if the balance instrument is of the type used in measuring pressure variations.

15 Claims, 2 Drawing Sheets

REINFORCED BASE ASSEMBLY FOR BEAM BALANCE INSTRUMENT

BACKGROUND OF THE INVENTION

The present invention relates generally to beam balance instruments and is particularly concerned with a reinforced base assembly for balanced beam manometers as used in liquid depth gauging to measure pressure variations as a result of depth changes.

Beam balances are commonly used in weighing, and accurate microbalances can measure very small weight differences. The beam balance principle has also been used in measuring pressure, substituting the force of a pressurized bellows for the weight to tilt the beam, so that a measure of the amount of tilt provides an indication of the applied force. Pressure responsive beam balance instruments are commonly used with a so-called "bubbler system" for monitoring liquid levels in tanks, reservoirs, and the like. In such systems, a trace flow of pressurized gas is passed down a bubbler tube extending into the liquid to a location close to the bottom, and the resultant pressure is measured at a convenient location via a suitable pressure responsive instrument, such as a beam balance. In the balanced beam or manometer, the pressurized line is connected to a bellows, and the bellows force is in turn applied to the beam of the manometer to change its tilt in response to pressure changes. A sensor is arranged to detect the null position of the beam, and is connected to a suitable drive mechanism to drive a poise along the beam to counterbalance the force applied by the bellows and return the beam to the null position. The travel of the poise is therefore proportional to the applied pressure, which in turn will be dependent on the liquid depth.

Instruments of the balanced beam manometer type are described in my U.S. Pat. Nos. 4,266,430, 4,274,039 and 4,277,981. In my co-pending application Ser. No. 07/411,873 filed Sep. 25, 1989, a technique for compensating for gas weights and other errors in such instruments as well as in other types of pressure responsive, liquid depth gauging instruments is described.

However, even with these error compensations it was found that some ambient temperature drift still existed in the balance beam manometer instrument, as a result of "squirming" of the sheet metal chassis with temperature change when this economical means of manufacture was first employed.

SUMMARY OF THE INVENTION

It is an object of this invention to provide a new and improved base assembly for a balanced beam manometer instrument to provide improved accuracy combined with economy.

According to the present invention, a base assembly for a beam balance instrument is provided which comprises a chassis having an upper wall, a reinforcing, rigid support in the upper wall for supporting a balance beam above the surface, the chassis having an elongated slot in its upper surface extending along at least part of the length of the beam, and the reinforcing support comprising a reinforcing strip member of thickness greater than that of the remainder of the chassis mounted in the slot, the reinforcing strip member having suitable openings for rigidly mounting a fulcrum for pivotally supporting the beam relative to the base, a pressure responsive device between the base and the beam for tilting the beam by an amount proportional to an applied pressure, and a sensor for detecting tilting of the beam and controlling a drive mechanism to drive the poise along the beam to a null position counterbalancing the applied force.

The reinforcing strip is of a suitable heavy and strong material which is resistant to irregular motion resulting from expansion and contraction as a result of ambient temperature changes, such as a rectangular bar of stainless steel of at least ⅛ inch thickness, while the chassis is of standard sheet metal of around 1/16 inch thickness. Since it is only necessary for the pressure responsive bellows, fulcrum and sensor to be rigidly supported relative to one another, it is not necessary for the entire base to be of such rigid material as the reinforcing strip, which would add to the expense and weight of the instrument. Instead, the chassis is of lightweight sheet metal provided with a strong back or spine in a relatively small area for supporting the parts which need to be fixed relative to one another to produce accurate results. Preferably, the reinforcing strip is of a metal which has been stress-relieved by heat treating in a process similar to annealing. This reduces internal stresses in the material which could otherwise produce some irregular movement or creeping as a result of temperature changes.

Preferably, the reinforcing strip or bar has a peripheral flange projecting outwardly around its periphery which seats on the upper surface of the chassis surrounding the slot while the strip extends downwardly through the slot. The flange is secured to the chassis via a three-point attachment with some free play to reduce distortion as a result of thermal contraction and expansion of the chassis itself. In one embodiment, the flange is secured via one or more screws or similar fasteners extending through aligned openings in the flange and chassis at one end of the strip, and via a single fastener extending through aligned openings at the opposite end, one of the openings comprising a slot to allow some relative longitudinal movement between the parts.

With this arrangement, only a relatively small part of the base assembly is rigid, the reinforcing strip or bar, while the remainder of the base can be of lightweight, economical material. The fulcrum, bellows and sensor or differential transformer are firmly secured to the reinforcing strip and are thus fixed relative to one another, substantially eliminating temperature drift while not adding significantly to the expense of the instrument.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DESCRIPTION OF THE PREFERRED EMBODIMENT

Figure 1:
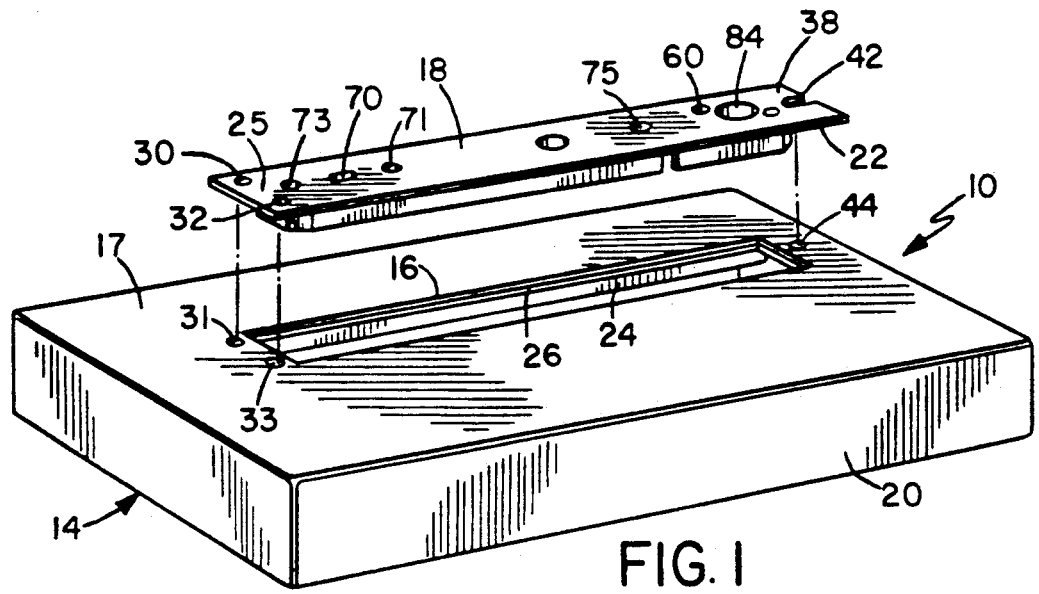
FIG. 1 is a perspective view of the beam balance chassis according to a preferred embodiment of the invention, with the reinforcing strip element separated.
Figure 2:
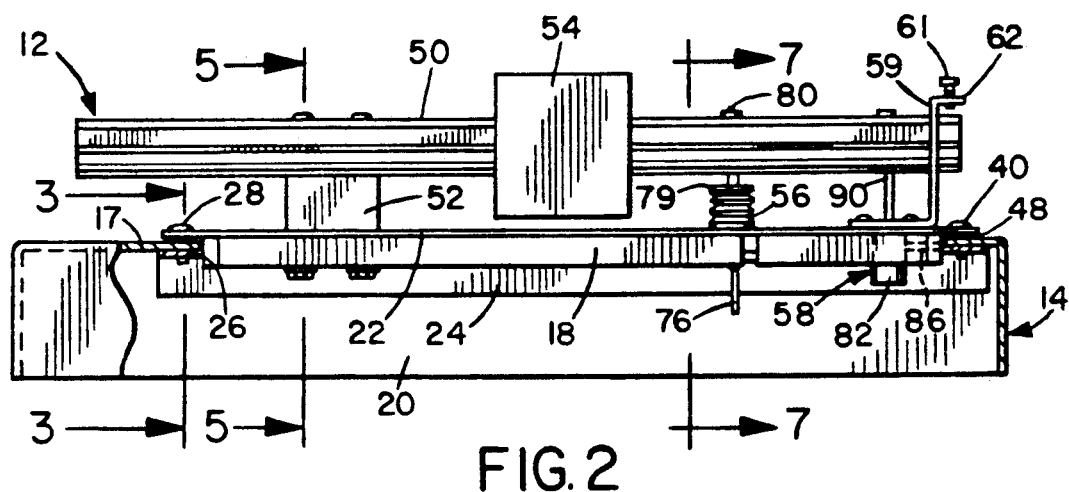
FIG. 2 is a side elevation view of the assembled beam balance, with portions cut away.

The drawings illustrate a base assembly 10 for supporting a beam balance instrument or manometer 12 of the type used in liquid depth gauging, for example. The base assembly basically comprises a box-like, open bottomed chassis or base 14 of relatively lightweight and inexpensive material such as stainless steel sheet material having an elongated slot 16 cut out in its upper wall 17, and a reinforcing strip or spine 18 of thicker, stronger material than the remainder of the chassis 14 inlaid into the slot 16, as best illustrated in FIGS. 1 and 2, for supporting various parts of the balance beam instrument. In a preferred embodiment of the invention, the reinforcing strip 18 was of $\frac{1}{8}$ inch thick, cold rolled, homogeneous, stress-relieved stainless steel alloy 304. The metal was stress-relieved by heat treating to remove internal stresses, in a process similar to annealing. The chassis was of cold formed sheet metal of the same alloy, but of only 1/16 inch thickness. The reinforcing strip is therefore significantly more massive and resistant to movement than the reminder of the chassis.

Figure 3:
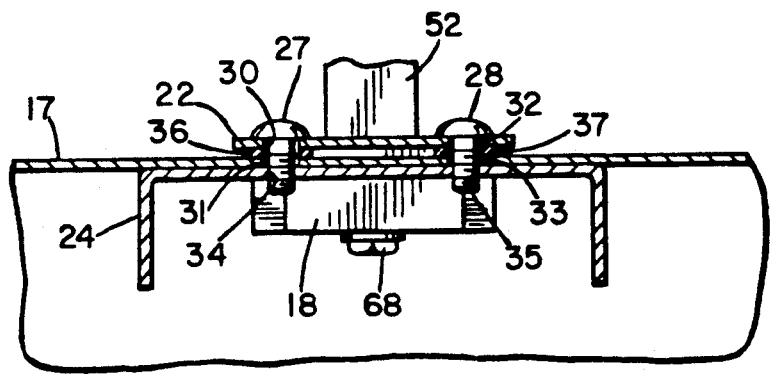
FIG. 3 is an enlarged sectional view taken on line 3—3 of FIG. 2.

The chassis 14 has peripheral, downwardly depending walls 20 and is open at its lower end. The reinforcing strip has a peripheral, outwardly projecting flange or lip 22 which seats around the periphery of slot 16 while the remainder of the strip extends downwardly through the slot into the hollow interior of chassis 14, as illustrated in FIG. 2. A reinforcing channel member 24 having a slot 26 aligned with the slot 16 in chassis upper wall 17 is welded against the inner surface of wall 17, and the flange 22 is secured to the wall 17 and underlying channel member 24 at one end 25 via two screw fasteners 26, 28 which extend through aligned openings 30, 31 and 32, 33 in the flange and wall, respectively, and aligned threaded openings 34, 35 in the channel member 24. Resilient annular washers 36, 37 are mounted on the screw fasteners 26, 28 between flange 22 and the chassis upper wall 17, as best illustrated in FIG. 3. At its opposite end 38 the strip is secured to the underlying chassis via a third screw fastener 40 which extends through an open ended slot 42 in the flange 22, an aligned opening 44 in the upper wall 17 of the chassis, and an aligned threaded opening in the channel member 24. An annular washer 48 is also mounted on the fastener 40 between flange 22 and the underlying wall 17, as illustrated in FIG. 2.

This three-point, floating attachment between the reinforcing strip and the remainder of the chassis allows some degree of relative longitudinal movement between these parts, which can accommodate some degree of thermal expansion and contraction of the chassis relative to the reinforcing strip without distortion of the base.

The reinforcing strip or spine is provided with various openings along its length for mounting various parts of the balance instrument as illustrated in FIG. 2. The balance components are of a conventional nature, for example as described in my U.S. Pat. No. 4,277,981. Although the base assembly in the preferred embodiment illustrated in the drawings is used for supporting a balance beam for use in a liquid depth gauging application, it may also be used in any beam balance equipment requiring high accuracy, and will substantially reduce or eliminate temperature drift in such instruments.

As illustrated in FIG. 2, a balance beam 50 is pivotally mounted above the chassis 10 via fulcrum 52 which is rigidly mounted on the reinforcing strip. A poise 54 is slidably mounted on the beam, and a bellows or other pressure responsive device 56 is secured between the beam and the reinforcing strip for tilting the beam in response to pressure applied via a line (not illustrated). A sensor device 58 is also rigidly mounted on the reinforcing strip for detecting tilting of the beam at one end. The sensor device 58 is connected to suitable servomotor circuitry (not illustrated) mounted inside the chassis for driving the poise 54 along the beam to a null position counter-balancing the force applied by bellows 56. An L-shaped stop plate 59 is mounted on the strip 18 via fastener screws or the like which extend into threaded openings 60 provided in the strip 18 for this purpose. Stop plate 59 has a central opening through which the beam extends, as illustrated in FIG. 2, and a stop or beam clamping screw 61 extends downwardly through a down-turned lip 62 at the upper end of plate 59 to engage the beam and prevent movement during transportation or set up of the equipment. Other parts of the beam balance instrument, which are omitted from the drawings for reasons of clarity, will be mounted within or on the chassis as appropriate, in a conventional manner.

Figure 5:
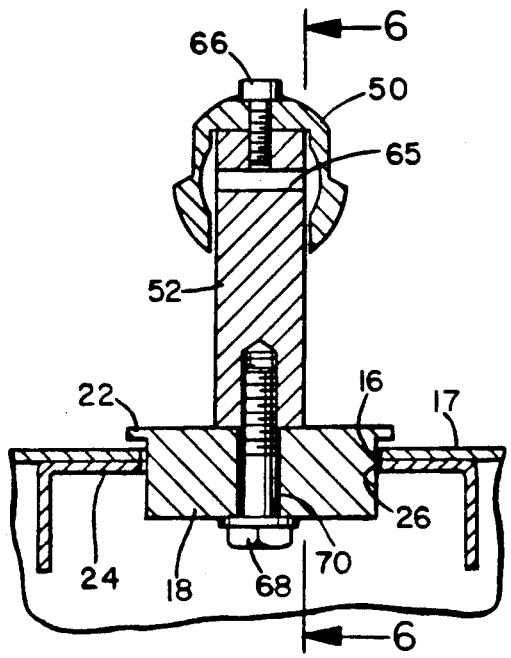
FIG. 5 is an enlarged sectional view taken on line 5—5 of FIG. 2.
Figure 6:
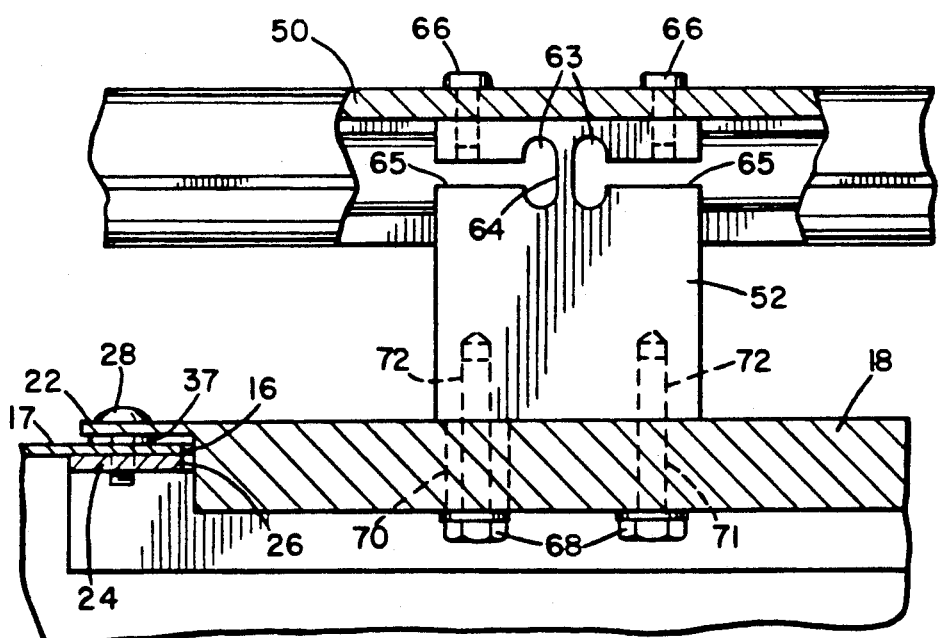
FIG. 6 is a sectional view taken on line 6—6 of FIG. 5.

The mounting of the fulcrum 52 on the reinforcing strip 18 is illustrated in more detail in FIGS. 5 and 6. Fulcrum 52 is in the form of a flexure pivot machined in a block with transverse cut outs 63 spaced apart at their inner ends to leave a thin web 64, and horizontal slots 65 extending outwardly from each of the cut outs 60, as illustrated in FIG. 6. The web 64 flexes and provides a fulcrum as the beam 50 tilts. The fulcrum is secured to the beam 50 via spaced screws 66, and is rigidly secured to the strip 18 at its lower end via a pair of spaced screws 68 which extend through bores 70, 71 in the strip 18 into threaded openings 72 in the fulcrum block 52.

Figure 4:
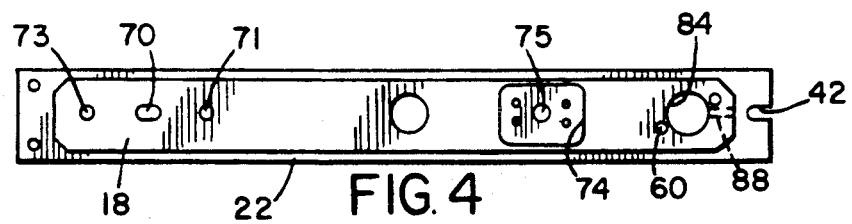
FIG. 4 is a bottom plan view of the reinforcing strip.
Figure 7:
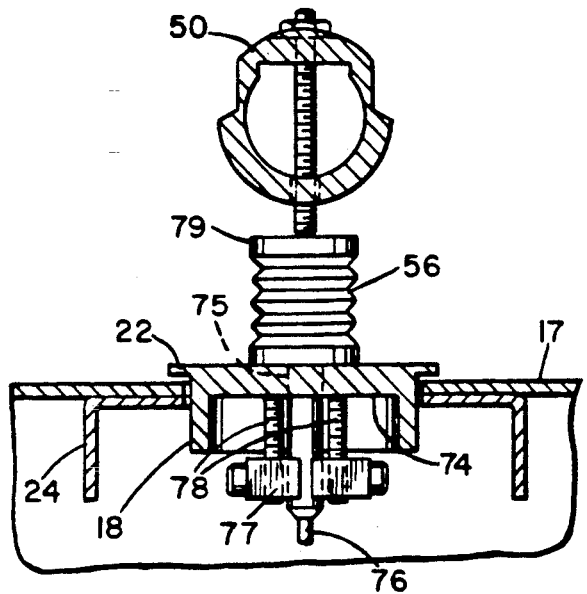
FIG. 7 is a sectional view taken on line 7—7 of FIG. 2.

The reinforcing strip has a rectangular recess or cut out 74 on its inner face, as best illustrated in FIGS. 4 and 7, and a through bore 75 at the center of recess 74 for receiving the pressure attachment or inlet 76 which extends from one end of the bellows 56 to the source of pressure to be measured. The bellows itself is suitably secured in place at one end on the upper surface of strip 18 via clamp member 77 secured on inlet 76 and screws 78 extending through the clamp member to bear against the inner surface of strip 18, as illustrated in FIG. 7. Tightening of screws 78 will force bellows 56 downwardly against the upper surface of strip 18. A screw 80 extends transversely through the beam to mate with a ball on the top end 79 of bellows 56.

The null position sensor 58 is a differential transformer sensor, and includes a cylindrical transformer body 82 which is mounted in a bore 84 provided adjacent one end of the reinforcing strip 18. Transformer body 82 is secured in position via a transverse fastener screw 86 extending through a threaded bore 88 extending from the end of strip 18 into bore 84. Armature 90 extends downwardly from the beam 50 into transformer body 82. Suitable outlets (not illustrated) from the transformer are connected to suitable servo-motor driving circuitry in a conventional manner to drive the poise along the beam until a null position is reached in which the armature is electrically centered in the transformer body.

With this arrangement, the fulcrum, sensor, and pressure applying device or bellows are held substantially rigidly on the reinforcing strip relative to one another, substantially reducing or eliminating relative movement between these elements as a result of any temperature variations. In prior art arrangements, where the entire instrument was supported on a simple, thin sheet metal structure, internal stresses in the metal as a result of the cold working or rolling process used in manufacture were found to produce creeping in the metal and resultant temperature drift of the results. However, it has been found that it is not necessary to reinforce the entire base against such temperature drifts, but on the contrary only a relatively small part of the base structure need be made rigid in order to substantially reduce or eliminate such drifts. In the illustrated embodiment, the sheet metal chassis is reinforced only along a spine or strip area underlying part of the balance beam, so that the fulcrum, bellows, and differential transformer can be firmly secured relative to one another. This approach has been found to dramatically reduce temperature errors in a consistent manner.

The reinforcement is produced both by making the reinforcing strip more bulky and thicker than the remainder of the chassis, preferably at least 5 times thicker than the sheet metal thickness, and preferably also by heat treating the reinforcing strip in a process similar to annealing to reduce internal stresses, producing a so-called stress-relieved metal. Thus, dramatic improvements in results can be produced relatively inexpensively, and the base assembly will remain relatively lightweight and easy to handle even with the reinforced spine or strip.

Although a preferred embodiment of the invention has been described above by way of example only, it will be understood by those skilled in the field that modifications may be made to the disclosed embodiment without departing from the scope of the invention, which is defined by the appended claims.

I claim:

1. A base support assembly for a beam balance instrument, comprising:
   a box-like chassis of sheet material having an upper wall and side walls depending downwardly from the upper wall;
   support means mounted on the upper wall of the chassis for supporting a balance beam above the upper wall;
   the chassis upper wall having an elongated slot; and
   said support means comprising a reinforcing strip member mounted in said slot, said strip member being of thickness greater than said sheet material forming said chassis, and mounting means for rigidly mounting a fulcrum for pivotally supporting the beam on said strip member and for rigidly mounting sensor means for detecting tilting of the beam in response to an applied force on said strip member.

2. The assembly as claimed in claim 1, wherein said strip member is of a material which has been stress relieved by heat treating.

3. The assembly as claimed in claim 1, wherein said strip member has a thickness at least 5 times that of the sheet material forming the remainder of the chassis.

4. The assembly as claimed in claim 1, wherein said strip member has an upper face and a lower face, a peripheral flange projecting outwardly around said upper face for seating against the upper wall of said chassis surrounding said slot with the remainder of said strip member projecting downwardly through said slot, and fastener means for securing said flange to said chassis upper wall.

5. The assembly as claimed in claim 4, wherein said fastener means comprises two fasteners at one end of said strip member and a third fastener at the opposite end of said strip member.

6. The assembly as claimed in claim 5, wherein a resilient washer is mounted on each of the fasteners between said flange and the underlying surface of said chassis upper wall.

7. The assembly as claimed in claim 5, wherein said flange and chassis upper wall have aligned openings for receiving said fasteners, at least one of the openings comprising an elongated slot for allowing some relative movement between the strip member and chassis material.

8. The assembly as claimed in claim 1, wherein said strip member has a series of openings for receiving said mounting means.

9. The assembly as claimed in claim 1, including a reinforcing channel member secured to the lower surface of said upper wall along the length of said slot, the channel member having a slot matching and aligned with said slot in the upper wall of said chassis.

10. A beam balance instrument, comprising:
    a base of sheet material having an upper wall and downwardly depending side walls;
    an elongated reinforcing strip member of thickness greater than that of the sheet material forming the base inlaid into the upper wall of the base;
    a balance beam;
    a fulcrum rigidly mounted on the reinforcing strip member and pivotally supporting the balance beam above the upper wall of the base; and
    sensor means rigidly mounted on the reinforcing strip member for detecting tilting of the beam in response to an applied force.

11. The instrument as claimed in claim 10, further including poise means slidably mounted on said beam, pressure responsive means between said reinforcing strip member and said beam for tilting the beam by an amount proportional to an applied pressure, and drive means responsive to said sensor means for driving said poise along the beam into a null position counterbalancing the force applied by said pressure responsive means.

12. The instrument as claimed in claim 10, wherein said base upper wall has an elongated slot extending beneath at least part of the length of the beam, and said reinforcing strip member comprises an elongated bar having a surrounding peripheral rim for seating on said upper wall surrounding said slot with the remainder of the strip member projecting downwardly through said slot.

13. The instrument as claimed in claim 12, further including fastener means for securing said rim to said upper wall, said fastener means including two fasteners at one end of said bar and a third fastener at the opposite end of said bar.

14. The instrument as claimed in claim 13, wherein said rim and underlying portions of said upper wall have aligned openings for receiving said fasteners, at least one of said openings comprising a slotted opening aligned with the longitudinal axis of said strip for allowing some relative movement between the base and reinforcing strip.

15. The instrument as claimed in claim 10, wherein the base is of sheet metal and the reinforcing strip is of stress relieved metal.

* * * * *